R. F. CRAWFORD.
TRACTOR ATTACHMENT FOR MOTOR CARS.
APPLICATION FILED AUG. 26, 1918.
1,303,856.
Patented May 20, 1919.
2 SHEETS—SHEET 1.
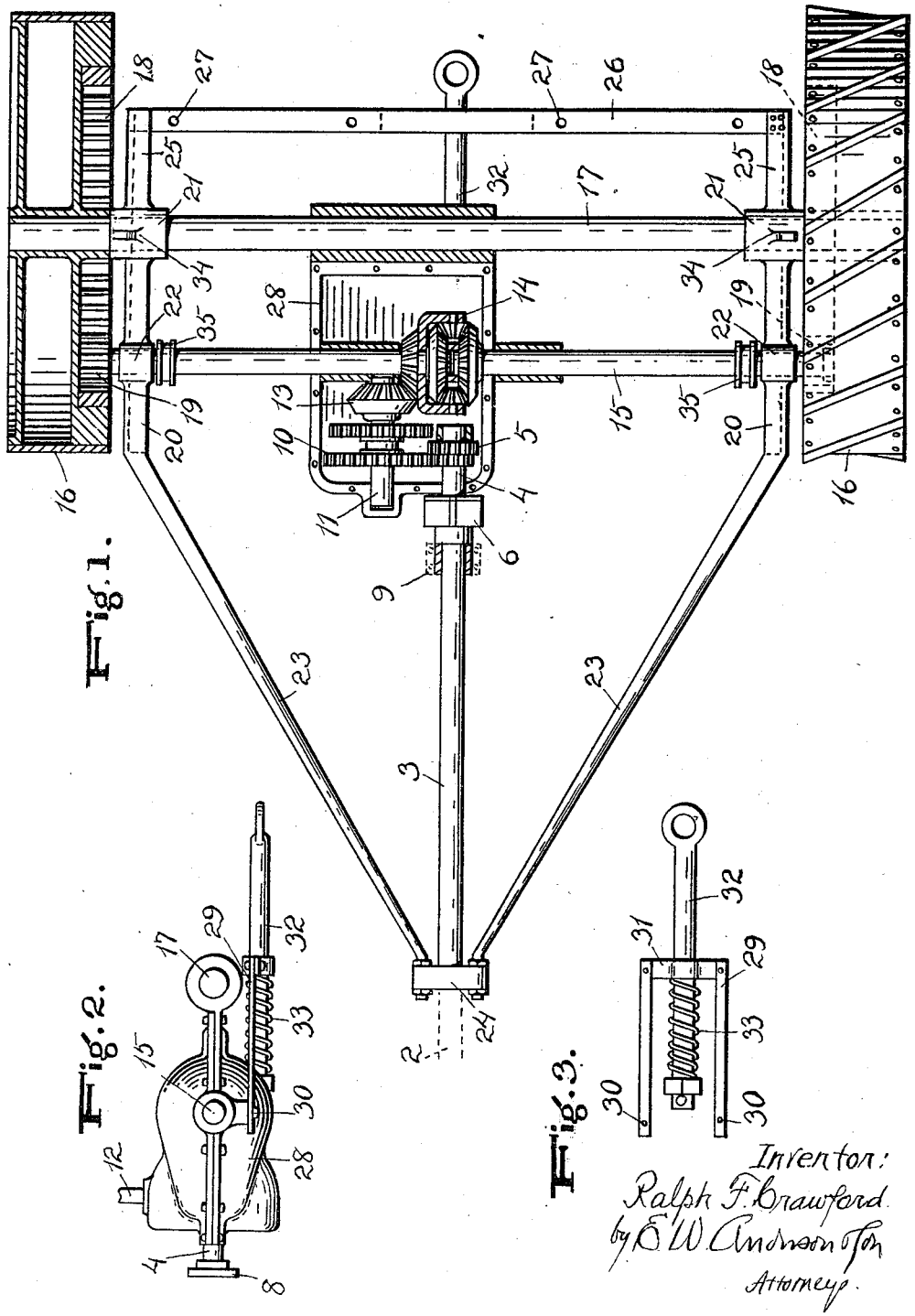

R. F. CRAWFORD.
TRACTOR ATTACHMENT FOR MOTOR CARS.
APPLICATION FILED AUG. 26, 1918.
1,303,856.
Patented May 20, 1919.
2 SHEETS—SHEET 2.
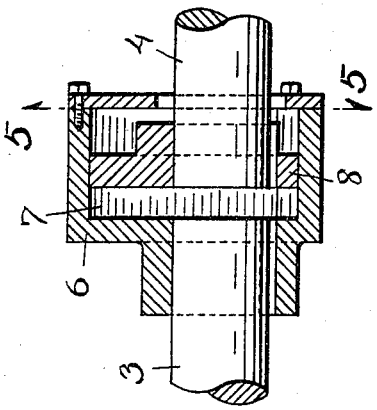
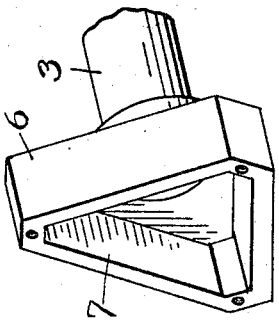
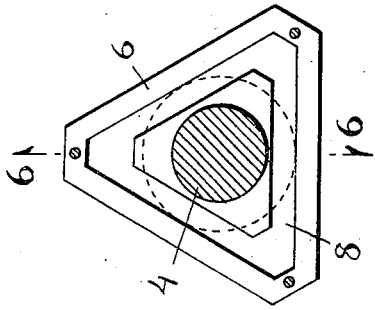
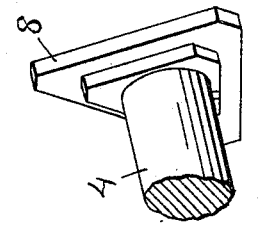
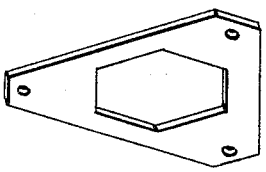
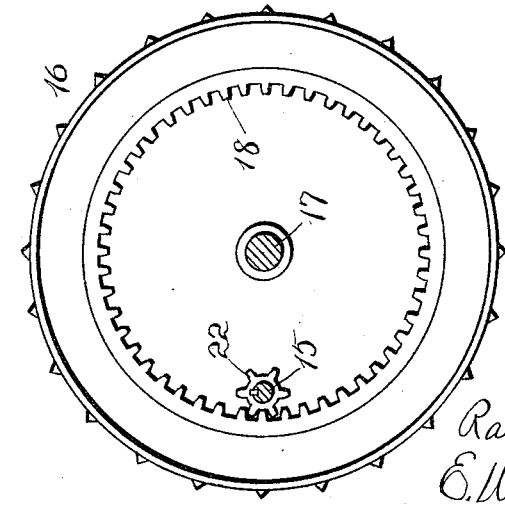
Inventor
Ralph F. Crawford.
E. W. Anderson
Attorneys

UNITED STATES PATENT OFFICE.

RALPH F. CRAWFORD, OF MONTICELLO, NEW YORK.

TRACTOR ATTACHMENT FOR MOTOR-CARS.

1,303,856.  Specification of Letters Patent.  Patented May 20, 1919.

Application filed August 26, 1918. Serial No. 251,424.

*To all whom it may concern:*

Be it known that I, RALPH F. CRAWFORD, a citizen of the United States, resident of Monticello, in the county of Sullivan and State of New York, have made a certain new and useful Invention in Tractor Attachments for Motor-Cars; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a plan view of the invention, partly in section.

Fig. 2 is a detail side view of the boxing and tug bar.

Fig. 3 is a detail plan view of the tug bar.

Fig. 4 is a detail side view of a tractor wheel.

Fig. 5 is a section of the universal joint on the line 5—5, Fig. 6.

Fig. 6 is a section of the same on the line 6—6, Fig. 5.

Figs. 7, 8 and 9 are detail perspective views of parts of this joint.

The invention has for its object to provide an attachment for a motor vehicle of any ordinary type, designed to convert a pleasure or business car or a truck into a tractor at comparatively short notice and without employment of a skilled mechanic.

The invention consists in the novel construction and combinations of parts, as hereinafter set forth.

In the accompanying drawings, illustrating the invention, the numeral 2 designates the longitudinal drive shaft of a car, said shaft ordinarily provided near the transmission end thereof with a universal joint. The rear section of the drive shaft, from the universal joint, together with the rear axle, differential and wheels, is removed prior to the attachment or use of my invention, leaving the chassis of the car undisturbed.

The attachment is provided with a longitudinal shaft 3, which is at one end thereof rigidly coupled to the shaft 2, to rotate therewith, having at its other end a suitable universal joint connection with a stub shaft 4, carrying one or more transmission gears 5, said joint preferably consisting of a hollow body member 6, fast upon the shaft 3 and having an angular cavity 7, wherein closely fits an angular plate 8, fast upon the shaft 4, said plate in the rotation of the shaft 3 in either direction rotating the stub shaft without lost motion, and the joint admitting of vertical movement of the shaft 3 with relation to the stub shaft, the former connected to the spring-supported chassis of the car at 9. This relative movement of the shafts is slight, owing to the reduced speed of the tractor, as well as to certain frame adjustments hereinafter referred to, under which conditions the universal joint described will prove satisfactory, its great strength and simplicity rendering its use very desirable.

The transmission gears 5 mesh with larger gears 10, which may be of different sizes, slidably mounted on a second stub shaft 11 and controlled by a shift lever 12, for selective engagement with the gears 5 in changing speed. A bevel gear 13 is fast to shaft 11, and meshes with bevel gearing upon the driving member of a differential 14, the latter serving to rotate the two members of a transverse divided jack shaft 15.

The tractor wheels to be substituted for the rear wheels of the car are shown at 16, being loosely mounted upon the axle or shaft 17 and provided with internal gears 18, with which pinions 19 upon the outer ends of the jack shaft are in mesh.

Longitudinal frame members 20, one at each side, are provided with sleeves 21, engaged loosely by the axle, and with sleeves 22, engaged loosely by the jack shaft, these members being extended forwardly and obliquely toward each other at 23, to a clip 24 upon the longitudinal drive shaft 3, and extended rearwardly, in parallel relation, at 25, a transverse bar 26 connecting the rear ends of the extensions 25 and being provided at intervals with perforations 27. The frame members 20 are preferably of angle form in the parallel portions 25; of simple rectangular cross-sectional form in the adjacent portions of the extensions 23, and are circular in cross-section at the ends near the clip 24.

A boxing 28 surrounds and incloses the gears 5, 10, 13 and 14, and contains oil wherein these gears will run, this boxing having bearings for the shafts 4, 11, 15 and 17, and serving to connect the driving devices in a substantial, rigid manner. A rearwardly extending bracket 29 is bolted to the boxing at 30, a perforation of the transverse bar 31 of said bracket being engaged by a tug or hitching bar 32, a spring 33 upon this bar serving to cushion the tug.

The rear springs of the car are designed to be connected to the sleeves 21, by means of bolts engaging perforations of upstanding lugs or hooks 34 of the sleeves. These springs may be rendered inactive by the addition of any suitable stiffening device, or they may be removed altogether and a rigid connecting member substituted, if desired.

Whether these rear springs are used or are dispensed with, my framing arrangement will reduce the angularity of the shafts 3 and 4, under the vibratory movements of the chassis of the car, as vertical movement of the drive shaft 2—3 will cause the frame 20, attached to the shaft at 24, to pivot upon the bearings 21, and thereby carry the rear end of the stud shaft 4 located intermediately of the points 24—21, more nearly in alinement with the universal joint and the pivotal point 21. This alining action will, of course, be more marked if the rear springs are rendered inactive, it being undesirable to interfere with the forward springs of the car.

Drums for the application of brake bands are shown at 35, upon the jack shaft.

By this invention it is designed to do away with the necessity of having more than one car, as either a pleasure or business car or a truck may be readily converted thereby into a tractor.

I claim:

1. A tractor attachment for automobiles, consisting of a longitudinal drive shaft adapted for coupling to the longitudinal drive shaft of the car, a stub shaft having a universal joint connection with said first-named shaft, a transverse jack shaft having driving connection with said stub shaft and pinions at each end thereof, tractor wheels having each an internal gear in mesh with one of said pinions, an axle for said wheels, lateral frame members having bearings wherein the axle and the jack shaft are journaled and forward extensions having connection with said longitudinal shaft, and a boxing having bearings for the axle, the jack shaft and the stub shaft.

2. A tractor attachment for automobiles, consisting of a longitudinal drive shaft adapted for coupling to the longitudinal drive shaft of the car, a stub shaft having a universal joint connection with said first-named shaft comprising an angularly recessed member fast to one shaft and an angular interfitting member fast to the other shaft, a transverse jack shaft having driving connection with said stub shaft and pinions at each end thereof, tractor wheels having each an internal gear in mesh with one of said pinions, an axle for said wheels, lateral frame members having bearings wherein the axle and the jack shaft are journaled and forward extensions having connection with said longitudinal shaft, and a boxing having bearings for the axle, the jack shaft and the stub shaft.

In testimony whereof I affix my signature in presence of two witnesses.

RALPH F. CRAWFORD.

Witnesses:
EDWARD F. RYAN,
ARTHUR C. KYLE.

Copies of this patent may be obtained for five cents each, by addressing the "Commissioner of Patents, Washington, D. C."